2,949,428

PROCESS FOR RENDERING LOCUST BEAN GUM COLD-WATER SOLUBLE

Albert J. Leo, La Grange Park, Ill., assignor to National Pectin Products Company, Chicago, Ill., a corporation of Illinois No Drawing. Filed Jan. 16, 1956, Ser. No. 559,124

5 Claims. (Cl. 252—363.5)

This invention relates to a new and improved method for the production of a novel locust bean preparation and more particularly to the production of a novel locust bean preparation having enhanced solubility, even in cold water. The invention is also concerned with a novel locust bean gum product of the foregoing nature. The new process is applicable to the production of other cold-water-soluble gums and colloids, as will be pointed out with more particularity hereinafter, but for the present the invention will be described with particular respect to the production of cold-water-soluble locust bean gum preparations.

It is well known that locust bean gum powder or flour, obtained from the fruit seeds of the locust or carob tree, possesses desirable adhesive, deflocculating and stabilizing properties which make it useful as an emulsifying agent, as well as a sizing and finishing agent in textile manufacturing. Equally well known, however, is the stubborn resistance of locust bean gum to water solubility or uniform aqueous dispersability. Such lack of water solubility has seriously militated against the use of locust bean gum in the various arts where its known properties would otherwise be most advantageous.

It is a prime object of the present invention, therefore, to render normally difficulty-soluble locust bean gum readily water-soluble, even in cold water.

It is a further object of the invention to provide a novel process for preparing such cold-water-soluble locust bean gum preparation.

Other objects of the present invention will be apparent from the following description and claims which, by way of illustration, show preferred embodiments and principles thereof and what are now considered to be the best modes contemplated in applying those principles. Other embodiments of the invention embodying the same or equivalent principles may be used and changes may be made as desired by those skilled in the art without departing from the present invention and the purview of the appended claims.

It has now been discovered, in accordance with the present invention, that locust bean gum and other related gums and colloids may be rendered cold-water-soluble by agitating a mixture of the colloid and sugar with water in the form of steam or a fine mist of water and under such predetermined conditions of moisture and relative component proportions that the mixture is in a solid, foamy, spongy state throughout the process, and then heating. It is the purpose of the invention to disrupt the normal "tight crystalline" pattern of locust bean gum with molecules of an easily soluble sugar. The normal locust-to-locust bonds are not disrupted in water until a temperature of 180° F. is reached, but if sugar is made to disrupt the normal pattern of locust-to-locust bonds, then when the sugar dissolves, the locust bonds are free to hold water even in the cold. This broad premise is not generally new. In the past, solutions of difficultly-soluble materials together with sugar have been dried to accomplish this purpose. The present invention is predicated, however, upon the unexpected discovery that this locust bean gum-sugar-moisture association can be accomplished in the solid, non-pasty, spongy, foamy state so that the mixture is at all times dry-appearing throughout the process. Actually, the process of bond disruption takes place in the liquid state, but enough gum is left in the solid state to form a network which holds up the entire mass and gives it the appearance of a spongy, foamy solid.

In fact, the solid consistency of the mixture is such that it can and does undergo shredding and tumbling action. The added sugar and water must be heated with the gum, so that when the gum molecules uncoil, the sugar is present to satisfy some of the bonds and prevent recoiling when returned to the dry state. In this way, one is not forced to handle large volumes of solution of a low concentration. With locust bean gum, a 2% solution becomes too thick to handle, and thus during much of the processing the active ingredient amounts to less than 2% of the bulk handled. Usually, these solutions are not thin enough to handle unless they contain no more than 0.5% to 0.75% gum. Obviously, then, this is not a very economical system. Hydrophyllic colloids, as a matter of fact, hold onto moisture very tenaciously and thus are very difficult to dry. Solutions of locust bean gum must be dried in very thin films and under high vacuum if too high temperatures are to be avoided. In the present process, the material forms a spongy mass which possesses a very high ratio of surface area to mass. With such a large surface area, drying at moderate temperature and atmospheric pressure becomes feasible.

Any convenient water-soluble sugar can be employed in the practice of the present invention but corn sugar (dextrose) is preferred because of its facility of performance and further because its price is low. Cane sugar may be employed when powdered to a sufficient fineness. Other sugars contemplated are, sucrose, fructose, lactose and maltose.

Generally speaking, the lower the ratio of locust bean gum to sugar, the greater the efficiency of the finished mixture when dissolved in the cold. For example, 10 gr. of locust bean gum when prepared 3:7 with sugar will have a higher viscosity when dissolved cold than if it were prepared 7:3. This is true when the final sugar concentrations are brought to the same value with added glucose. Cost of the additional sugar, processing a larger amount of material and dilution of active product set a practical lower limit on this ratio. However, the ratio of locust bean gum to sugar may be varied from 9:1 down to 1:9, the optimum and most useful range varying from 6:4 down to 3:7.

As to the moisture added in the form of steam or a very fine water spray, the higher moisture content present during the heating process, the more efficient the end product, but it should be understood that the amount of moisture added should not be so great as to change the mixture from a solid to a liquid state. The maximum moisture percentage which the various formulas can take and still retain the solid state for the mixture so that the mixture can be handled in conventional mixers are as follows:

| Locust bean gum ratio to sugar: | Percent moisture |
|---|---|
| 9:1 | 65 |
| 8:2 | 63 |
| 7:3 | 60 |
| 6:4 | 57 |
| 5:5 | 55 |
| 4:6 | 50 |
| 3:7 | 42 |

During the heating of the mixture of locust bean gum, sugar and fine water spray, a pressurized system at temperatures above 212° F. may be employed but usually not to good advantage. The process is more conveniently carried out in a cooker at atmospheric pressure. Optimum results are obtained when the mixture is heated and mixed for about 20 minutes at 200–212° F. Rapid cooling to a temperature at which shredding can be accomplished is desirable.

After the mixture is mixed and heated, it is cooled, shredded and then dried preferably at atmospheric pressure. Drying is preferably carried out in a concurrent, rotary air drier. In the presence of air (as in the drier as opposed to the steam atmosphere in the cooker), the temperature of the gum mixture should not be held higher than 200° F. for over 5 minutes. However, the ambient air in the inlet of the drier may be 400° F. or higher. Rapid surface evaporation keeps the gum mixture below the dangerous temperature. At the outlet, the ambient air temperature should be 240° F. and the product temperature around 180° F.

After drying, and for very rapid solubility, the material should be milled to a size smaller than 100 mesh.

The water spray should be as fine as possible and the mixture must be agitated well at the time of spraying. The volume of the material increases considerably during the spraying process, thus forming the sponge which is so vital to the subsequent drying operation. If left undisturbed, it forms a lightly-bonded rubbery cake. During heating the cake bonds to form a material resembling foam rubber. Efficient heat transfer can be obtained only in thin layers. To facilitate an even heat distribution and to eliminate the need for shredding large chunks of material to feed to the drier, an agitated heater is preferred.

The hot material can be cooled to the required degree by an air blast. It should not be cooled any lower than is necessary to efficiently shred it small enough for proper drying. Agitation during the drying process is vital to prevent re-bonding.

The following specific example is given by way of illustration and it will be understood of course, that the invention is in no way limited thereto:

Filtered water is forced by means of a turbine pump through three ¼" #22 spray nozzles at 100 pounds per square inch pressure into the blended gum and sugar (4 parts locust gum and 6 parts corn sugar) which is being agitated in a stainless steel D-10 steam-jacketed, interrupted-ribbon type blender. A pre-set timing device controls the amount to be sprayed. The relative amount of fine water mist is 45–55% of the final weight. The mixed material is heated by means of the steam jacket, and as long as the system is enclosed and moisture does not escape, there is no burning on the sides. The temperature is recorded automatically, and the entire cycle is set up for automatic control. After heating and steaming at 200–212° F. for 20 minutes, a large volume of filtered air is passed through the agitated mixture to cool it to about 140° F. It is then transferred to a stainless steel hopper which leads to a screw-fed model D Fitzmill, which in turn leads to a 16 foot stainless steel, forced air, rotary dryer. The dried product is conveyed to a screw fed model K Fitzmill for grinding to −100 mesh.

When steam is employed in lieu of the fine water spray, the process is carried out by blowing the powdered mixture of gum and sugar into a steam chamber, collecting it at the bottom, and keeping the mixture hot by moving it to the drier through a steam-jacketed screw conveyor.

As pointed out hereinbefore, the process of the present invention is appliacble to the production of cold-water-soluble gums or colloids other than locust bean gum. For example, the process is equally applicable to the production of wold-water-soluble pectin, Irish Moss, gelatin and algins. In making cold-water-soluble pectin, in accordance with the invention, the ratio of pectin to sugar may be varied from 9:1 down to 4:6, the optimum range being 5:5, and with this latter ratio the maximum percentage of moisture is about 35%. In the case of Irish Moss and gelatin, those materials are generally used as minor additions to locust bean gum.

What is claimed as my invention is:

1. A process for rendering locust bean gum cold-water-soluble which comprises: agitating a mixture of locust bean gum flour and sugar, the weight ratio of locust bean gum to sugar being from 9:1 to 1:9; spraying the mixture with water during agitation, in a total amount of water not exceeding about 65% of the final weight of the entire mixture so that the amount of added moisture is not great enough to change the mixture to a liquid state; during spraying, heating the mixture to a temperature ranging from not substantially below 180° F. to the temperature at which the water boils, so that the mixture forms a spongy mass; comminuting the spongy mass; drying the comminuted material; and then milling the dried material.

2. A process for rendering locust bean gum cold-water-soluble which comprises: agitating a mixture of locust bean gum and sugar, the weight ratio of locust bean gum to sugar being from 9:1 to 1:9; while agitating the mixture spraying it with a fine spray of water, discontinuing the addition of water to the mixture before the relative amount of water is substantially in excess of 65% of the final weight, so that the mixture forms a lightly bonded sponge-like solid mass; heating the sprayed mixture at 200°–212° F. for about 20 minutes; cooling the mixture; then comminuting it; and then drying the comminuted mixture with agitation.

3. A process for rendering locust bean gum cold-water-soluble which comprises: mixing locust bean gum flour and sugar in proportions such that the weight ratio of locust bean gum to sugar is from 9:1 to 1:9; adding water to the mixture in the form of a fine mist, and at the same time agitating the mixture to effect substantially uniform distribution of the water throughout the mixture; discontinuing the addition of water to the mixture before the relative amount of the water is substantially in excess of 65% of the final weight of the entire mixture so that the mixture remains in substantially a solid state; heating the mixture to a temperature ranging from not substantially below 180° F. to the temperature at which the water boils, so that it forms a spongy mass; and then drying and milling the mixture.

4. In the process for rendering locust bean gum cold-water-soluble, the characterizing steps of: adding water in the form of a fine mist to a mixture of locust bean gum and sugar in proportions such that the weight ratio of locust bean gum to sugar is from 9:1 to 1:9; agitating the mixture as the water is being added to effect substantially uniform dispersion of the water throughout the mixture; discontinuing the addition of the water before the relative amount thereof is substantially in excess of about 65% of the weight of the mass; and heating the mixture to a temperature not below about 180° F. and not exceeding the temperature at which the water boils so that the mixture forms itself into a spongy mass which has a high ratio of surface area to mass and may be readily dried.

5. The process of claim 4, further characterized by the successive steps of cooling, shredding and drying the spongy mass after heating.

References Cited in the file of this patent

UNITED STATES PATENTS

| Number | Name | Date |
|---|---|---|
| 1,629,716 | Leo, A. | May 24, 1927 |
| 1,646,157 | Leo, H. | Oct. 18, 1927 |
| 1,818,263 | Leo, A. | Aug. 11, 1928 |
| 2,000,807 | Wig | May 7, 1935 |
| 2,147,960 | Baier | Feb. 21, 1939 |
| 2,772,178 | Kunze et al. | Nov. 27, 1956 |
| 2,856,288 | Peebles | Oct. 14, 1958 |